APPARATUS FOR SIMULATING RADIO NAVIGATION AIDS

Original Filed Nov. 12, 1947 4 Sheets-Sheet 1

INVENTOR.
RICHARD C. DEHMEL

BY Orin R. Severn
his ATTORNEY.

APPARATUS FOR SIMULATING RADIO NAVIGATION AIDS
Original Filed Nov. 12, 1947 4 Sheets-Sheet 2
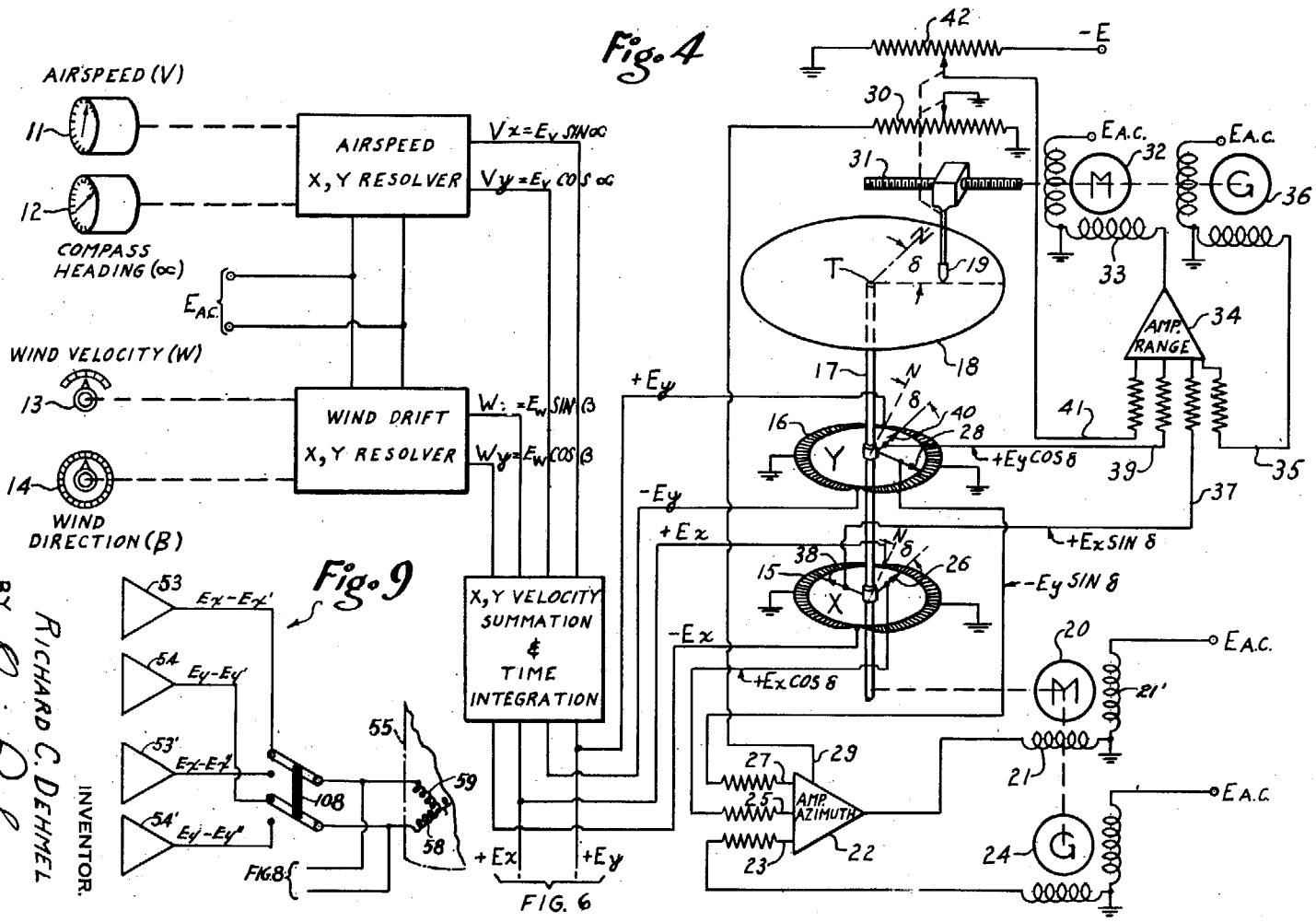
INVENTOR.
RICHARD C. DEHMEL
BY Orin R. Swern
his ATTORNEY.

APPARATUS FOR SIMULATING RADIO NAVIGATION AIDS

Original Filed Nov. 12, 1947 4 Sheets-Sheet 3

INVENTOR.
RICHARD C. DEHMEL

BY Orin R. Severn
his ATTORNEY.

APPARATUS FOR SIMULATING RADIO NAVIGATION AIDS
Original Filed Nov. 12, 1947 4 Sheets-Sheet 4
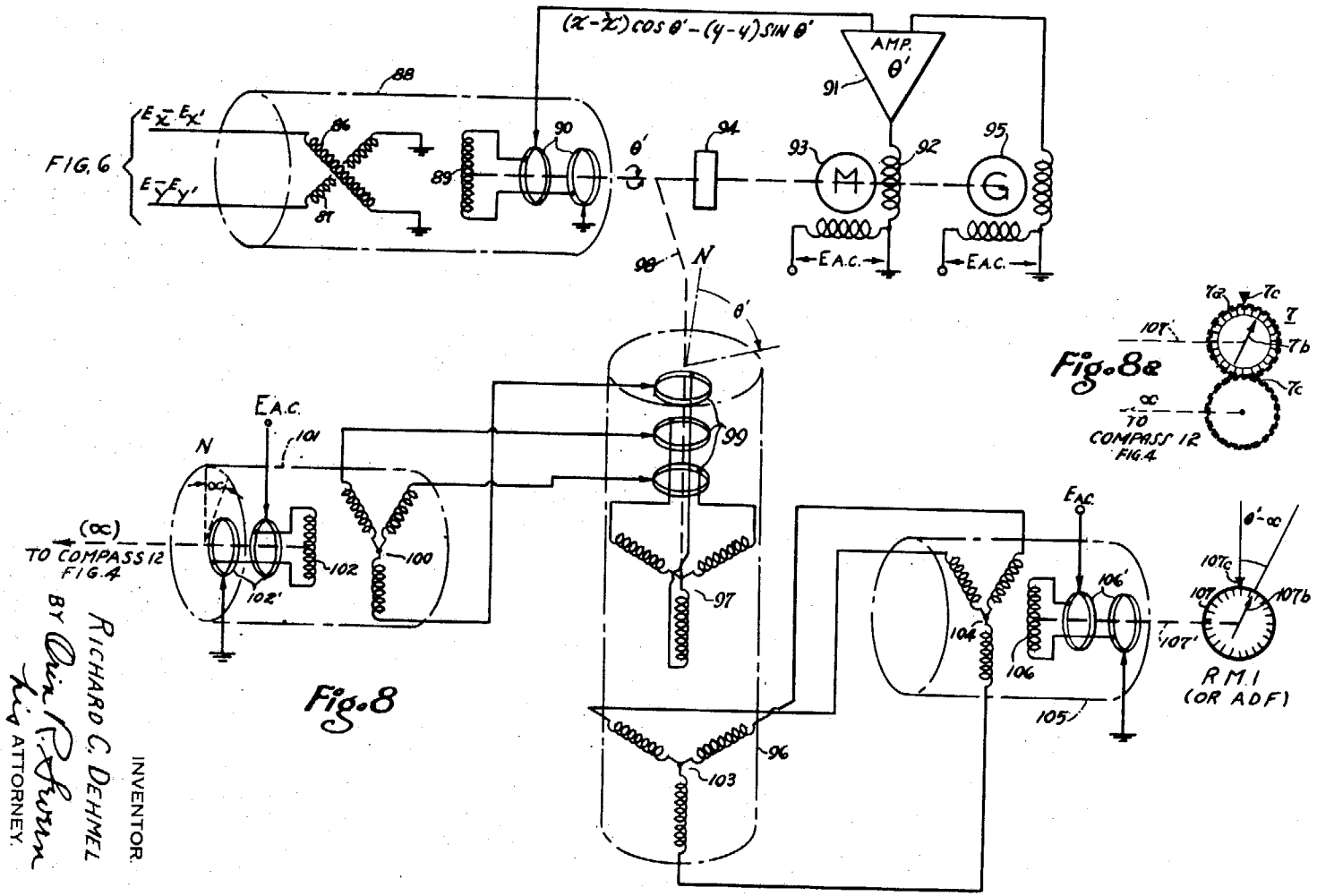
INVENTOR.
RICHARD C. DEHMEL
BY Orin R. Storrs
his ATTORNEY.

Reissued Mar. 10, 1953

Re. 23,627

UNITED STATES PATENT OFFICE 23,627

APPARATUS FOR SIMULATING RADIO NAVIGATION AIDS

Richard Carl Dehmel, Short Hills, N. J.

Original No. 2,560,527, dated July 10, 1951, Serial No. 785,225, November 12, 1947. Application for reissue March 26, 1952, Serial No. 278,664

24 Claims. (Cl. 35—10.2)

Matter enclosed in heavy brackets [ ] appears in the original patent but forms no part of this reissue specification; matter printed in italics indicates the additions made by reissue.

This invention relates to a method of and apparatus for simulating radio navigation aids, particularly omni-directional radio navigation aids and compass locator equipment of the automatic direction finding type used in aircraft.

The comparatively new omni-directional range (ODR) radio facility uses a very high frequency (VHF) transmitter which radiates signals for giving an infinite number of courses radiating from the radio station, as contrasted with the conventional low frequency A and N radio range which has but four radiating direction beams. Radio receiving apparatus in the aircraft when tuned to a particular ODR station is designed to give a direct (or reciprocal) reading of the aircraft bearing with respect to the station without reference to the instant heading of the aircraft, i. e. the ODR receiver is position, not heading sensitive. In practice this station bearing may be coordinated with the aircraft magnetic compass heading in order to give both magnetic heading information and a direct pointer course to the station in the manner of well known automatic direction finder (ADF) apparatus. Furthermore this station bearing may be co-ordinated with distance measuring equipment (DME) for obtaining a "fix" on a single ODR station, the distance to the station being determined by the time required for a radio signal to travel from the plane to the station and return. In an alternative arrangement, the "radial," i. e. bearing from station to plane, to be flown is set into a so-called "radial selector" that is related to the vertical needle of the standard cross-pointer instrument to indicate deviation from the radial.

A particularly practical way of using the omni-directional range in combination with DME has been proposed whereby offset course computing is greatly facilitated so that simply by determining known bearing and distance data from his maps the pilot can set his computer and fly directly by pointer indication from any one point to another within the range of a given ODR station. As in the case of conventional A and N radio ranges, ODR stations are located at various positions about the country so that cross-country flying may be done by tracking on consecutive legs in respective omni-directional ranges.

A principal object of this invention is to provide an improved method of and apparatus for simulating offset course computing and indicating equipment of actual aircraft for pilot training and also for simulating the receiving and indicating equipment for providing automatic direction finding data; and it is a special feature of my invention that the same apparatus is useful to provide the simulation of both equipments above referred to.

Another important feature of my invention is that it may be used in combination with fully automatic radio range and ADF training apparatus of the character described in my co-pending patent applications Serial No. 607,333 filed July 27, 1945, for Aircraft Training Apparatus and Serial No. 678,553 filed June 22, 1946, for Radio Training System for Aircraft Pilots respectively, for conjointly giving A and N range signals, instrument landing system (ILS), Z marker and fan marker signals, compass locator and all the various radio navigation aids including dual ADF operation cross-country and consecutive omni-directional and offset course tracking. The first mentioned application has matured into Patent No. 2,529,468 dated November 7, 1950, and the second named application has become Patent No. 2,533,361 dated Decembes 12, 1950.

The invention will be more fully set forth in the following description referring to the accompanying drawings, and the features of novelty will be pointed out with particularity in the claims annexed to and forming a part of this specification.

Referring to the drawings

Fig. 4 is a partly diagrammatic and schematic layout of flight computing and charting apparatus including means for deriving voltages for operating the offset course computer of the present invention;

Fig. 8 is a layout similar to Fig. 6 of additional computing apparatus operable from certain circuits of Fig. 6 for giving remote magnetic indication (RMI) or ADF information in accordance with the azimuth or compass heading of the aircraft;

Fig. 8a illustrates a preferred alternative arrangement of the RMI apparatus conforming to general practice; and Fig. 9 illustrates schematically the use of duplicate apparatus.

Figure 1:
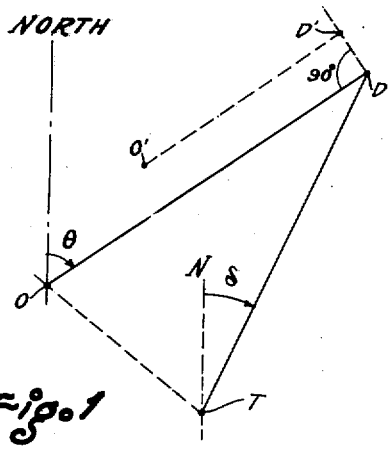
Fig. 1 is a diagram illustrating offset course navigation with respect to an ODR station.

The operation of ODR equipment in actual aircraft for offset course computing will be generally described with reference to Figs. 1 to 3. In Fig. 1 the location of an ODR transmitting station is indicated at T and it will be assumed that an airplane is located at an origin point O and the pilot wishes to fly to a destination point D along the path OD which is offset with respect to transmitter T, the points O and D being within the range of VHF signals from the station. The pilot therefore can readily determine in advance from his maps certain essential data such as the offset course bearing $\theta$, the distance TD from station to destination and a so-called angle-of-radial $\delta$ which is the bearing of point D from station T; also the co-bearing of station T from point D thus defining point D as a "compass locator station." This data is set into the computer represented by the panel 1, Fig. 2, by means of respective dials, the dial 2 representing adjustment for tuning in the ODR station frequency, dial 3 the desired course bearing $\theta$, dial 4 the radial angle $\delta$ and dial 5 the distance TD.

Figure 3:
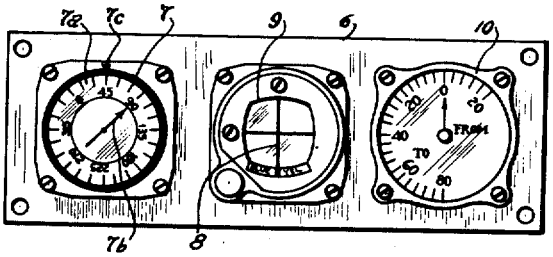
Fig. 3 illustrates the pilot's instrument panel for giving direction, tracking and distance information.
Figure 2:
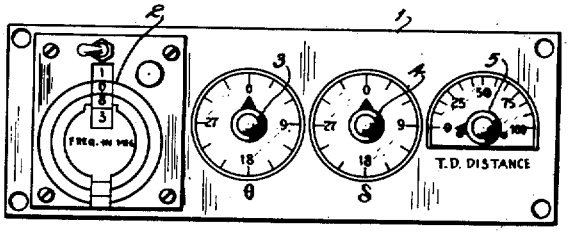
Fig. 2 illustrates the pilot's computer panel with dials for setting up the offset course problem.

When the above computer dials of Fig. 2 are thus adjusted for the course OD, the offset course computer in the aircraft will actuate the instruments on the tracking information panel 6 of Fig. 3 as the course is flown to give the following information. The radio magnetic indicator (RMI) indicated at 7, Fig. 3, is a radio compass indicator somewhat similar to the standard ADF equipment and gives the magnetic compass heading at the fixed index or "lubber line" 7c from the rotatable dial card 7a, the pointer 7b being under control of the offset course or ADF computer to continuously point to the destination bearing from the aircraft. The vertical needle 8 of the conventional cross-pointer instrument 9 shows the direction and amount of lateral displacement away from the course OD and the pointer of meter 10 shows on the "To" scale the distance still to go from the instant position of the airplane to the destination along the line OD. Accordingly for accurately flying the course OD regardless of wind drift it is necessary merely to hold the course bearing indicated by the RMI meter at angle $\theta$ or to keep the vertical cross-pointer needle centered. If the aircraft drifts off course to a point O' for example the distance-to-go meter 10 indicates the distance to point D' along the parallel course O'D', the line D'D being perpendicular to OD and the distance D'D being represented by deflection of the vertical cross-pointer. When the aircraft passes point D the pointer of distance meter 10 moves through zero to indicate distances beyond the destination on the "From" scale.

For solving simpler problems, such as "homing" not involving offset course computation, as where the pilot wishes to fly directly from point O to the station along track OT, there is sometimes provided a combined meter for showing whether the flight is toward or away from the station T in addition to giving distance and bearing information. This meter uses a manually operated azimuth set crank and has a shutter operable to uncover a reciprocal bearing reading and to cover the original bearing reading when the aircraft passes beyond the station. In the above homing problem the dial 5 of Fig. 2 is set at zero since the station and destination points are identical. For this case the course bearing $\theta$ is the angle measured clockwise from the north reference direction at point O to the course OT, the setting of dial 4 being immaterial since dial 5 is set at zero.

Where an instrument landing system (ILS) of well known type is to be used in a subsequent approach to a landing field, the cross-pointer meter may be used in combination with the glide and localizer of that system and the RMI can be used as an ADF indicator or compass locator stations.

Figure 6:
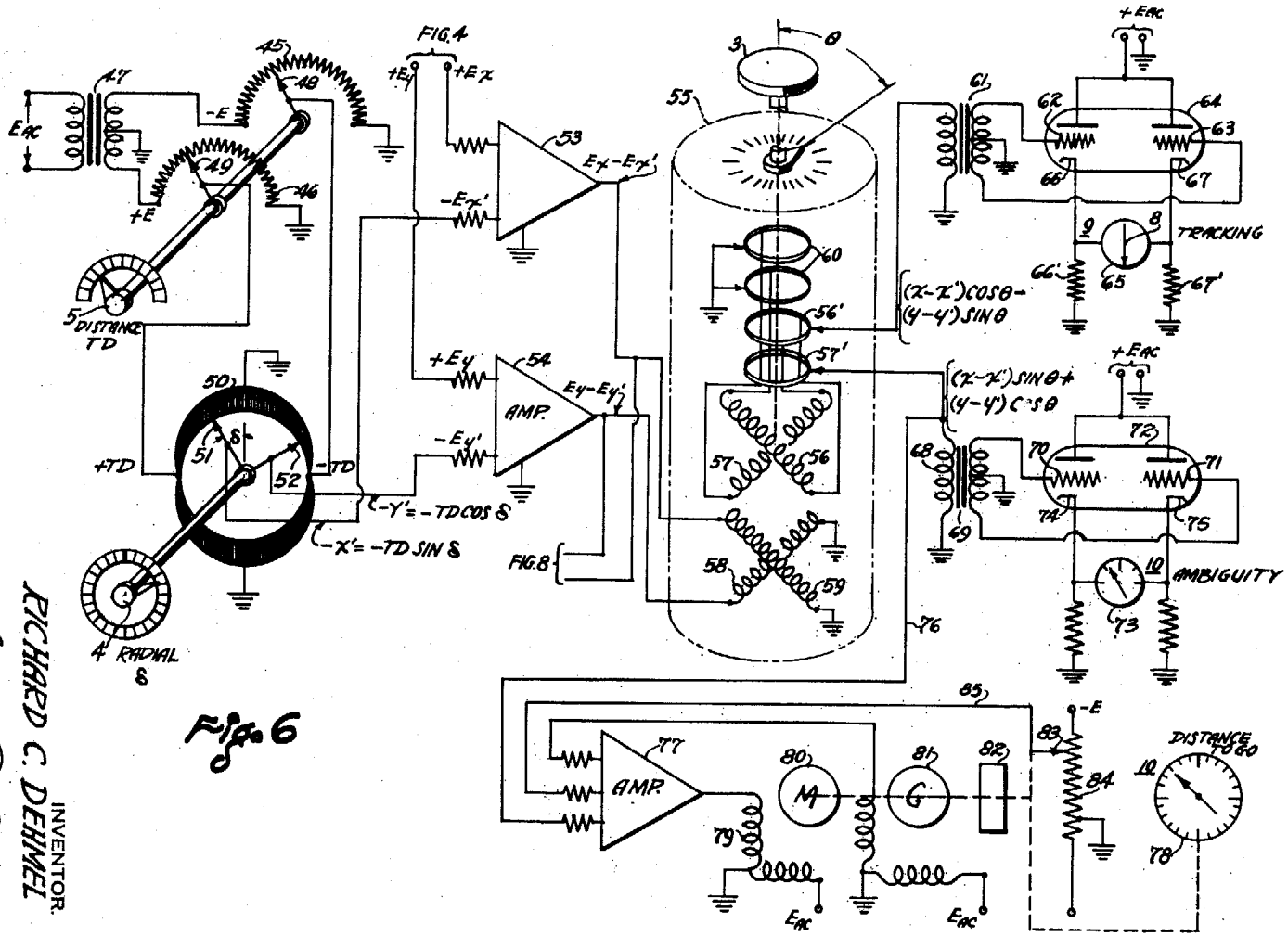
Fig. 6 is a partly diagrammatic and schematic layout of offset course computing apparatus for giving tracking information and also distance-to-go and ambiguity information.

Referring now to Fig. 4 a computing and charting system is illustrated including resolving and integrating apparatus for charting the simulated flight and for obtaining position voltages to be used in the offset course computing apparatus of Figs. 6 and 8. The apparatus of Fig. 4 is shown schematically and will be described briefly since it is specifically disclosed and described in my aforesaid application S. N. 607,333. The input data may be obtained from the simulated air speed meter 11, magnetic compass indicator 12 and the wind drift velocity and direction dials 13 and 14 respectively. The instruments 11 and 12 may be operated in accordance with the operation of well known ground trainer apparatus, such as that disclosed in my Patent No. 2,366,603 granted January 2, 1945, for Aircraft Training Apparatus. The wind drift dials 13 and 14 are set manually to simulate any given condition of wind drift.

The "air speed resolver" which is energized by a derived voltage proportional in magnitude to the air speed V is adjusted in accordance with the compass heading angle $\alpha$ for obtaining component voltages $E_V \sin \alpha$ and $E_V \cos \alpha$ designated as $V_x$ and $V_y$ respectively to represent velocity along the x and y axes respectively of a reference Cartesian coordinate system, and the "wind drift resolver" which is adjustable according to the wind direction $\beta$ similarly resolves the voltage representing the wind velocity W into the components $E_W \sin \beta$ and $E_W \cos \beta$ designated respectively as $W_x$ and $W_y$. The aforesaid voltage components are all fed to a summing and integrating system as indicated for summing the x velocity components $V_x$ and $W_x$ and the y velocity components $V_y$ and $W_y$ to give resultant x and y velocity values representing ground speed. These ground speed components are then integrated as to time for producing voltages representing the x and y coordinate values for the instant flight position on a chart.

Where a polar coordinate chart is used the aforesaid x and y position voltages may be converted to polar coordinate values by means of voltage resolvers such as the X and Y cosinusoidal potentiometers 15 and 16 which are controlled by the shaft 17 of the rotatable polar chart 18. The center of the chart, i. e. shaft 17, represents the position of the radio station T and the chart is positioned according to the bearing of the aircraft from the station by means of a servo mechanism.

The radial distance of the airplane from the station is represented by the position of the pen 19 which operates radially with respect to point T. The chart shaft 17 which positions the polar chart 18 and slider contacts of the resolver potentiometers 15 and 16 is operated as indicated by a two-phase motor 20 the control winding 21 of which is energized from the azimuth summing amplifier 22. Assuming, for purposes of specific illustration, that the instant position of the aircraft O', Fig. 7, coincides with the destination D, then the inputs to amplifier 22 include a negative velocity feed-back voltage at input conductor 23 from the motor-driven two-phase generator 24, a voltage $+E_x \cos \delta$ at input conductor 25 from slider contact 26 of the X resolver and a voltage $-E_y \sin \delta$ at input conductor 27 from slider 28 of the Y resolver.

Figure 5:
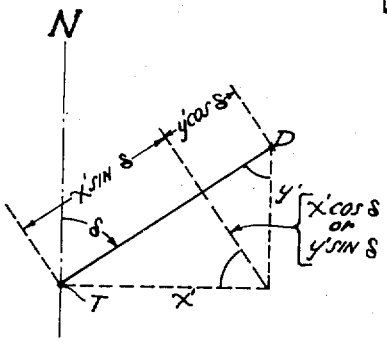
Fig. 5 is a vector diagram illustrating vector resolutions as performed by the apparatus of Fig. 4.

When these x and y voltages of opposite sign are equal, the output of the amplifier is zero and the position of the chart corresponds to the correct azimuth angle $\delta$ as diagrammatically shown by Fig. 5. That is, for a condition wherein $x' \cos \delta = y' \sin \delta$, there can be but one stable value for angle $\delta$. The amplifier, Fig. 4, is also provided with a gain control circuit 29 including a resistance 30 and is varied according to range as indicated for obtaining uniform operation of the azimuth motor 20 at all values of $E_x$ and $E_y$ potentials applied to potentiometers 15 and 16, Fig. 4. The voltage applied to winding 21 differs 90° in phase from the $E_{ac}$ signal on winding 21', this phase shift being obtained within the amplifier 22 in well known manner. The pen 19 is positioned by means of a lead screw 31 and two-phase motor 32, the control winding 33 of which is energized by the output of the range summing amplifier 34.

Referring again to Fig. 5 it will be apparent that the range, or distance TD in this instance is $x' \sin \delta + y' \cos \delta$. Hence, the amplifier inputs include a negative velocity feed-back voltage at conductor 35 from the motor-driven two-phase generator 36, a voltage $+E_x \sin \delta$ at conductor 37 from the slider 38 of the X resolver, a voltage $+E_y \cos \delta$ at conductor 39 from slider 40 of the Y resolver, and finally a balancing voltage at conductor 41 from the range controlled potentiometer 42. As explained in my aforesaid application S. N. 607,333 the azimuth motor 20 and the range motor 32 each operate to search for a new position of balance, i. e. the new instant flight position, when the position voltages $+E_y$ and $-E_y$ energizing the resolver Y, and the voltages $+E_x$ and $-E_x$ energizing the resolver X vary according to change in flight position.

It is to be noted that when the coordinates x and y of the flight position are each zero, the pen 19 is at the center of the chart, Fig. 4. This point is assumed to be the location of the radio transmitter T. With the destination point D, Fig. 5, displaced from point T by coordinates x' and y', the values of these coordinates are: $x' = TD \sin \delta$, and $y' = TD \cos \delta$. Therefore as above described in connection with Fig. 4, the values x' and y' may be derived from a resolver energized by a voltage proportional to the distance TD and adjusted according to the angle $\delta$.

For this purpose there is provided referring to Fig. 6 a pair of A. C. potentiometers 45 and 46, each winding being suitably contoured in practice for loading so as to produce a linear relationship between the derived voltage and the amount of slider contact displacement for the load represented by potentiometer 50. The potentiometers are separately energized from a source of reference voltage $E_{ac}$ through a transformer 47, the secondary of which has a grounded center tap for producing voltages of opposite instant polarity at the respective potentiometer terminals. The slider contacts 48 and 49 are adjustable simultaneously by means of the TD distance dial 5, Fig. 2, for deriving output voltages representing −TD and +TD respectively. These voltages are used as indicated to energize a sine-cosine potentiometer 50, or alternatively a magnetic resolver such as a one-phase-two-phase synchro rotary transformer (not shown), which can be set to the angle $\delta$. In the present instance the sliders 51 and 52 are adjusted according to this angle by means of the $\delta$ dial 4, Fig. 2, for deriving the destination coordinate voltages $E_{x'}$ and $E_{y'}$ corresponding respectively to the values $TD \sin \delta$ and $TD \cos \delta$ above referred to. The angle $\delta$ is measured between the indicated ground or zero axis of the potentiometer and the slider 51.

Figure 7:
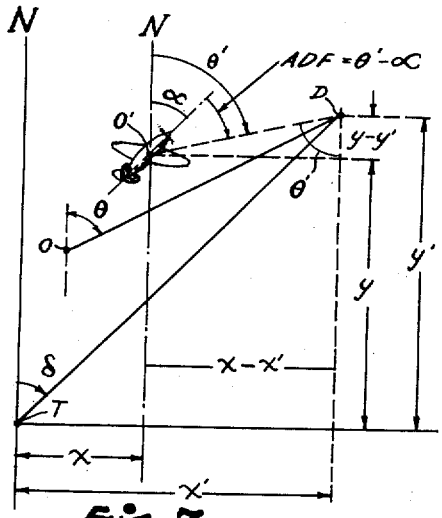
Fig. 7 illustrates coordinate computation and the charting of offset course flights.

Reference is now made to the diagram of Fig. 7 in which the instant position of the aircraft is indicated at a point O' that is off the desired course OD. As shown, the coordinates of point O' are x and y and those of point D are x' and y' so that taking the instant position as the reference point the coordinate difference is (x−x') and y−y'). Assuming now that point O' is on the desired course OD the relationship between these coordinate differences and the correct course angle $\theta$ may be expressed as $$\tan \theta = \frac{x-x'}{y-y'}$$

Hence, $$\frac{\sin \theta}{\cos \theta} = \frac{x-x'}{y-y'}$$

and $$(x-x') \cos \theta = (y-y') \sin \theta$$

It is also to be noted, with reference to the geometry of Fig. 7, that the disance $$O'D = (y-y') \cos \theta + (x-x') \sin \theta$$

Referring again to Fig. 6, voltages are obtained corresponding to the above coordinate difference values by summing the derived instant, and destination coordinate voltages as by means of a pair of summing amplifiers 53 and 54, the amplifier 53 using voltage inputs $+E_x$ and $-E_{x'}$ for obtaining an output voltage $E_x - E_{x'}$ and the amplifier 54 using input voltages $+E_y$ and $-E_{y'}$ for obtaining an output voltage $E_y - E_{y'}$. These output voltages are used to energize one set of two-phase windings of a synchronous rotary transformer 55 having two-phase stationary and two-phase rotary windings, the rotary coils 56 and 57 being adjustable to any desired value of angle $\theta$ with respect to the fixed coils 58 and 59 by means of the $\theta$ dial 3, Fig. 2.

As shown, the stationary coils 58 and 59 are energized by voltages corresponding to Y−Y' and x−x' respectively and it can be shown that the voltages induced in the rotary coils for a given orientation of angle $\theta$ correspond to $$(x-x') \cos \theta - (y-y') \sin \theta$$

for one coil such as 56, and $$(x-x')\sin\theta+(y-y')\cos\theta$$

for the other coil 57. Hence, if the ratio $$\frac{x-x'}{y-y'}$$

is held constant and at the correct value, namely $$\tan^{-1}\frac{x-x'}{y-y'}=\theta$$

there will be no output voltage on the coil 56 of the rotary transformer. Now, since x' and y' are fixed constant amounts, having been preset by the TD dial 5, the variables are the coordinate voltages which depend on the aircraft instant position and which were derived from Fig. 4 as $E_x$ and $E_y$. Accordingly if the x and y voltage values representing instant position are held in the correct ratio to make $$\tan^{-1}\frac{x-x'}{y-y'}=\theta$$

then the phase output voltage $$(x-x')\cos\theta-(y-y')\sin\theta$$

at coil 56 will be zero and this can be used as an indication that the aircraft is on-course, as shown diagrammatically by Fig. 5. Any deviation of x or y values from the correct relative values will cause a voltage of the aforesaid value to be induced in the phase winding 56 and this voltage will have an instant polarity and magnitude proportional to the direction and amount of deviation from the correct on-course path respectively.

Accordingly the voltage from phase winding 56 may be impressed on a phase sensitive A. C. meter to simulate the vertical needle of the cross-pointer indicator 9 of Fig. 3, or if preferred this voltage may be rectified by a phase sensitive rectifier and used to operate the vertical needle of a standard D. C. cross-pointer indicator. As shown the output terminal of coil 56 is connected through a slip-ring connection 56' to the primary of transformer 61, Fig. 6, the other terminal being connected to ground through a slip-ring 60. The secondary of transformer 61 has a grounded center tap and is connected at opposite terminals to the control grids 62 and 63 of a phase sensitive thermionic twin-rectifier 64 the anodes of which are energized by the aforesaid reference voltage $E_{ac}$. This rectifier operates in well known manner. A D. C. indicating meter 65 is connected across the respective cathodes 66 and 67 so as to be responsive both in sense and in magnitude to the rectified potential. The meter 65 is zero centered in the vertical position shown as in the case of the vertical needle of the cross-pointer meter so that tracking information can be obtained from deviation of the needle in either direction from the zero position in accordance with the preceding description. Elements 66' and 67' are cathode load resistances.

Similarly in accordance with adjustment of the rotary transformer 55 to angle $\theta$, the voltage $(x-x')\sin\theta+(y-y')\cos\theta$ induced in the other phase winding 57 corresponding to the distance-to-go O'D is used to operate a meter simulating the distance meter 10 of Fig. 3, or any conventional form of ambiguity meter indicating passage to or from the station. To this end the output terminal of winding 57 is connected through a slip-ring connection 57' to the primary winding 68 of a transformer 69 and the other terminal is connected to ground through one of the slip-rings 60. The secondary winding of transformer 69 is provided with a grounded center tap and is connected in the manner above described to control grids 70 tnd 71 of a thermionic phase sensitive rectifier 72 having a D. C. meter 73 connected across the cathodes 74 and 75. The meter 73 simulates the distance meter 10 of Fig. 3 and is therefore adapted to indicate the position of point O' with respect to the destination D and show whether the simulated flight is approaching the destination or has passed beyond it since the output of winding 57 reverses in phase after the flight has passed through zero at the destination indication.

The output of phase winding 57 may also be used for operating a distance and ambiguity indicator through a more precise servo mechanism of the follow-up type. The output voltage is connected by conductor 76 to an amplifier 77 for controlling a servo operated distance-to-go and ambiguity meter 78. The output of the amplifier energizes the control windings 79 of a two-phase motor 80 of the type illustrated in Fig. 4 and the motor drives a negative velocity feed-back generator 81 and positions through a gear reducer 82 the slider contact 83 of an "answer" potentiometer 84. The derived negative voltage from slider contact 83 is fed by conductor 85 to the amplifier input for balancing the servo when the opposing "answer" voltage equals the input distance voltage from the rotary transformer. By means of the automatic balancing servo system above described the meter 78 is positioned to indicate accurately the sense and magnitude of the input system voltage to give both distance and ambiguity information. The velocity feed-back is employed in well known manner to avoid servo oscillation.

The method and means for operating the indicator simulating the RMI (or ADF) indicator 7 of Fig. 3 will now be described. Referring to Fig. 8 the windings 86 and 87 of a two-phase-one-phase synchronous rotary transformer 88 are energized by voltages $E_x-E_{x'}$, and $E_y-E_{y'}$, from the amplifiers 53 and 54 respectively of Fig. 6. The single-phase winding 89 of the transformer secondary is rotatable with respect to the fixed windings 86 and 87 and may be if desired mechanically coupled to a servo mechanism designed to rotate the coil 89 toward a position where the voltage induced in the coil is a minimum. Specifically, the output terminal of the coil 89 is connected through a slip-ring connection 90 to the input of a motor amplifier 91, the output of which energizes the control winding 92 of a two-phase motor 93 that is mechanically coupled as indicated through a gear reducer 94 to the coil 89. The motor 93 also drives a generator 95 for producing a negative velocity feed-back voltage for the input of amplifier 91 for servo damping. The servo motor 93 is responsive to the induced voltage $(x-x')\cos\theta'-(y-y')\sin\theta'$ from coil 89. By reason of the fact that the motor is so polarized that it runs in the direction of minimizing this voltage, it will be seen that the servo will come to rest and set itself to the angle $\theta'$ which will satisfy the relation $$(x-x')\cos\theta'-(y-y')\sin\theta'=0$$

Accordingly this angle $\theta'$, referring to Fig. 7, is the direction of the destination D from the north reference direction as seen at the aircraft.

In an alternative and simplified arrangement for positioning the coil 97, the servomotor 93 and its associated equipment may be dispensed with and the shaft of coil 89 used directly to position coil 97. In this case the terminals of coil 89 would be energized by the reference voltage $E_{ac}$ for providing sufficient torque to move coil 89 to a stabilized position. Since the bearing angle $\theta'$ is without reference to the instant heading of the aircraft and since the RMI indication of meter 7, Fig. 3, is the direction of destination D from the aircraft heading, namely $(\theta'-\alpha)$, it is necessary to subtract the azimuth of the aircraft heading $\alpha$ from the destination bearing $\theta'$. Referring again to Fig. 8 this may be accomplished in one form of the invention by means of the differential three - phase – three - phase synchronous rotary transformer 96 having one set of Y-connected windings 97 mechanically connected as indicated at 98 to the servomotor 93 for adjustment to the angle $\theta'$ The winding 97 is electrically connected through slip-ring connections 99 to a similar three-phase winding 100 of a synchronous rotary transformer 101 having a single-phase primary winding 102 that is adjustable according to the aircraft heading angle $\alpha$, as by means of a mechanical connection with the trainer compass 12, Fig. 4. The winding 102 is energized through a slip-ring connection 102' from an A. C. source.

The other three-phase winding 103 of the rotary transformer 96 is stationary and is electrically connected to a similar three-phase winding 104 of a one-phase–three-phase rotary transformer 105. The single-phase winding 106 is energized through slip-ring connection 106' from the same source of reference A. C. voltage as the $\alpha$ coil 102 and the coil 106 is mechanically connected at 107' to an indicator 107 for simulating a fixed scale type ADF indicator. The angle $(\theta'-\alpha)$ is read directly between the fixed reference index 107c and the pointer 107b.

The operation of the apparatus of Fig. 8 will be apparent from the above description and it is sufficient to state that as the $\alpha$ positioned coil 102 changes its orientation, the RMI or ADF positioning coil 106 moves through a corresponding angle in the manner of a synchronous repeater, assuming of course that the angle $\theta'$ does not change as in the case where the aircraft executes a "tight" circle. When the angular position of winding 97 is changed according to change in angle $\theta'$ the angular movement of coil 106 represents the ADF reading which is the difference between the angular movements of windings 107 and 102, i. e. $\theta'-\alpha$ as illustrated by Fig. 7.

In the preferred form shown by Fig. 8A, the RMI indicator 7 corresponds to that of Fig. 3 wherein the scale 7a and the pointer 7b are both independently rotatable to represent respectively magnetic compass reading and the magnetic bearing $\theta'$ of the destination D, Fig. 7. The scale 7a is indicated as mechanically connected through a unity ratio gearing 7d to the magnetic compass 12, Fig. 4, and the pointer 7b is connected to the shaft 107' of unit 105, the position of which indicates the angle $(\theta'-\alpha)$. Since the scale 7a rotates to repeat the magnetic compass reading, the orientation of this scale with respect to the fixed "lubber line" 7c is the magnetic heading of the airplane and the scale reading at the pointer is the magnetic bearing $\theta'$ of the destination.

It will therefore be seen from the above description of my invention that a student pilot may practice course tracking in a grounded trainer by setting the same kind of dials to establish his course and observing the same type of instruments as if he were in an actual aircraft. Furthermore it will be apparent that the student may practice "holding" problems wherein the aircraft shuttles between two given points while awaiting its turn for approaching a busy airport using standard radio compass ADF procedure. This is done by having the instructor set the TD and $\delta$ dials 5 and 4 respectively of Fig. 6 to the offset position desired for the compass locator station D with respect to the chart center T and using the apparatus of Fig. 8 for operating and following the RMI or ADF indicator 107 throughout the holding course. Where consecutive holding courses or cross-country tracking are involved and the aircraft advances in turn by course steps the compass locator point D then becomes a new origin point and the computer is set for a new compass locator point.

Also it will be understood that it is within the scope of the present invention as shown by Fig. 9 to duplicate apparatus of Figs. 6 and 8, including suitable circuits having a throw-over switch 108 for switching the two-phase–two-phase rotary transformer 55 of Fig. 6 together with the indicating meters 65, 75 and 78 from one pair of summing amplifiers 53, 54 to another duplicate pair 53', 54' for representing the second locator station, in order to simulate the use of two (or more) compass locator stations or destination points D. The duplicate set of summing amplifiers will be energized in the same manner as illustrated in Fig. 6, except that the second locator station will be represented by different coordinate voltages $E_x''$ and $E_y''$ derived from duplicate TD and $\delta$ controls whereby the outputs of the duplicate amplifiers are $(E_x-E_x'')$ and $(E_y-E_y'')$ respectively.

It will also be apparent that where duplicate sets of apparatus illustrated in Fig. 8 are provided the separate pointers of a dual ADF indicator (or dual RMI) may be operated respectively for obtaining in a well known manner cross-bearings, i. e. a plurality of "fixes" along the course at convenient intervals. Such duplicate apparatus is simply connected to the $E_x$ and $E_y$ output terminals of the circuit of Fig. 4 in parallel with and in the same manner as the apparatus of Figs. 6 and 8. Specifically, the reading for a single station is obtained by the disclosed apparatus in the manner above described. In order to get a concurrent reading for another station, duplicate apparatus corresponding to the radial and distance potentiometers 50, 45 and 46 and the associated summing amplifiers 53 and 54, is connected as indicated to the out-put terminals of the apparatus of Fig. 4. These terminals are energized by voltages $E_x$ and $E_y$ representing the instant flight position. It will be noted that the duplicate potentiometers provide for off-setting so that the aforesaid instant flight position voltages can be used in combination therewith. The output terminals of the duplicate summing amplifiers are in turn connected as indicated to duplicate apparatus corresponding to Fig. 8 for representing the other station. The radial and distance values for the other station are then set into the duplicate computing apparatus in the same manner as Fig. 6 for obtaining dual ADF indication.

*It will be apparent that where ADF or dual ADF operation is simulated the TD and $\delta$ values would be set in by the instructor, usually by a duplicate*

*set of dials at the instructor's station, thus simulating a tuned condition of an aircraft radio receiver (or receivers) to the radio station (or stations) in question. Thus, the needle (or needles), 107b of an ADF indicator, Fig. 8, continuously bear on the respective station as the simulated flight proceeds. Where DME and off-course tracking are simulated, the student sets the TD and 8 dials as in actual practice.*

It should be understood that this invention is not limited to specific details of construction and arrangement thereof herein illustrated, and that changes and modifications may occur to one skilled in the art without departing from the spirit of the invention.

What is claimed is:

1. In a training system for simulating radio navigation between two points defining a course offset with respect to a radio range reference station, electrical apparatus for computing distance values which comprises means for deriving a pair of voltages representing Cartesian x and y coordinates of instant position of the simulated flight, means for deriving potential according to magnitude of the distance between said station and the destination point, resolving means energized by said distance potential and adjustable through an angle representing a bearing angle from said station to said destination point for obtaining voltages representing the Cartesian x and y coordinates of said destination point, means for summing algebraically the aforesaid instant position and destination point voltages for the x and y axes respectively for obtaining voltages representing the coordinate difference values, additional resolving means energized by said difference voltages and adjustable through an angle representing the desired course bearing for obtaining potential representing the magnitude of the distance from instant position to said destination point respectively, and indicating means energized by said last-named potential.

2. In a training system for simulating radio navigation between two points defining a course offset with respect to a radio range reference station, electrical apparatus for computing course deviation values which comprises means for deriving a pair of voltages representing Cartesian x and y coordinates of instant position of the simulated flight, means for deriving potential according to magnitude of the distance between said station and the destination point, resolving means energized by said distance potential and adjustable through an angle representing a bearing angle from said station to said destination point for obtaining voltages representing the Cartesian x and y coordinates of said destination point, means for summing algebraically the aforesaid instant position and destination point voltages for the x and y axes respectively for obtaining voltages representing the coordinate difference values, additional resolving means energized by said difference voltages and adjustable through an angle representing the desired course bearing for obtaining potential representing the extent of deviation from said course, and indicating means energized by said last-named potential.

3. In a training system for simulating radio navigation between two points defining a course offset with respect to a radio range reference station, electrical apparatus for computing course deviation and distance values which comprises means for deriving a pair of voltages representing Cartesian x and y coordinates of instant position of the simulated flight, means for deriving potential according to magnitude of the distance between said station and the desination point, resolving means energized by said distance potential and adjustable through an angle representing a bearing angle from said station to said destination point for obtaining voltages representing the Cartesian x and y coordinates of said destination point, means for summing algebraically the aforesaid instant position and destination point voltages for the x and y axes respectively for obtaining voltages representing the coordinate difference values, additional resolving means energized by said difference voltages and adjustable through an angle representing the desired course bearing for obtaining a pair of voltages representing the extent of deviation from said course and the magnitude of the distance from instant position to said destination point respectively, and a pair of indicating means energized respectively by said last-named pair of voltages.

4. Training apparatus for simulating radio navigation between two points defining a course offset with respect to a radio range reference station comprising means for deriving voltages representing the coordinates of instant position of a simulated flight, means initially adjustable according to the relative position of said station with respect to the destination point for obtaining voltages representing the position coordinates of said destination point, computing means initially adjustable according to the desired flight course bearing from an origin point to said destination point and jointly responsive to said instant position and destination coordinate voltages for obtaining potential representing deviation from said flight course, and indicating means controlled by and in accordance with said last-named potential for indicating the extent of deviation from said course.

5. Training apparatus for simulating radio navigation between two points defining a course offset with respect to a radio range reference station comprising means for deriving voltages representing the coordinates of instant position of a simulated flight, means initially adjustable according to the relative position of said station with respect to the destination point for obtaining voltages representing the position coordinates of said destination point, computing means initially adjustable according to the desired flight course bearing from an origin point to said destination point and jointly respective to said instant position and destination coordinate voltages for obtaining voltages representing deviation from said flight course and the instant distance to said destination point respectively, and indicating means controlled by and in accordance with said last-named voltages for indicating respectively course deviation and the instant distance to destination.

6. Training apparatus for simulating radio navigation in either direction with respect to a radio range reference station and another point comprising means for deriving potentials representing the coordinates of instant position of a simulated flight, means for obtaining potentials representing the coordinates of said point, computing means initially adjustable according to the desired flight course bearing and jointly responsive to said instant position potentials and said point coordinate potentials for obtaining in turn voltages representing deviation from said flight course and the instant distance to destination respectively, and indicating means controlled by said last-named voltages for indicating respectively course deviation and the instant distance to destination.

7. Training apparatus for simulating radio navigation with respect to a radio range reference station and another fixed point comprising means for deriving potentials representing the coordinates of instant position of a simulated flight, means initially adjustable according to the distance between said station and said fixed point and to a bearing angle from said station to said point for obtaining potentials representing the coordinates of said point, computing means initially adjustable according to the desired flight course bearing and jointly responsive to said instant position potentials and said point coordinate potentials for obtaining in turn voltages representing deviation from said flight course and the instant distance to destination respectively, and indicating means controlled by said last-named voltages for indicating respectively course deviation and the instant distance to destination.

8. Training apparatus for simulating radio navigation *between two points* [between two points defining a course offset] with respect to a radio range reference station comprising means for representing the compass heading of the aircraft, means for deriving voltages representing coordinates of instant position of a simulated flight, means initially adjustable according to the relative position of said station with respect to the destination point for obtaining voltages representing the position coordinates of said destination point, servo positioning means operable according to said instant and destination coordinate voltages for representing the actual course bearing at said instant flight position, and means adjustable according to the operation of both said course bearing means and compass heading means for positioning indicating means simulating an automatic direction finder.

9. Training apparatus for simulating radio navigation between two points defining a course offset with respect to a radio range reference station comprising means for deriving voltages representing the coordinates of instant position of a simulated flight, means initially adjustable both according to the distance between said station and the destination point and to a bearing angle from said station to said destination point for obtaining voltages representing the position coordinates of said destination point, means including a voltage resolver initially adjustable according to the desired course bearing and jointly responsive to said instant and destination coordinate voltages for obtaining a course voltage representing deviation from said course and a distance voltage representing the instant distance to said destination point, and course and distance indicating means controlled by and in accordance with said course and distance voltages respectively.

10. Training apparatus for simulating radio navigation *between two points* [between two points defining a course offset] with respect to a radio range reference station comprising means for representing the compass heading of the aircraft, means for deriving voltages representing the coordinates of instant position of a simulated flight, means for obtaining voltages representing the position coordinates of the destination point, means controlled according to said instant and destination coordinate voltages for representing the actual course bearing for instant flight position and means adjustable according to the operation of both said course bearing and compass heading means for simulating an automatic direction finder.

11. Training apparatus for simulating radio navigation *between two points* [between two points defining a course offset] with respect to a radio range reference station comprising means for representing the compass heading of the aircraft, means for deriving voltages representing the coordinates of instant position of a simulated flight, means for obtaining voltages representing the position coordinates of the destination point, means controlled according to said instant and destination coordinate voltages for representing the actual course bearing for instant flight position and means including a synchronous resolver responsive to said last-named means and adjustable according to said actual course bearing and energized by potential derived according to the aforesaid compass heading for positioning an indicator simulating an automatic direction finder.

12. Training apparatus for simulating radio navigation *between two points* [between two points defining a course offset] with respect to a radio range reference station comprising means for representing the compass heading of the aircraft, means for deriving voltages representing the coordinates of instant position of a simulated flight, means for obtaining voltages representing the position coordinates of the destination point, means controlled according to said instant and destination coordinate voltages for representing the actual course bearing for instant flight position and means including a rotatable scale element adjustable with respect to a fixed index according to the operation of the aforesaid compass heading means and a pointer element jointly responsive to said course bearing means and said compass heading means and adjustable with respect to said scale for simulating automatic direction finding equipment.

13. Training apparatus for simulating radio navigation between two points defining a course offset with respect to a radio range reference station comprising electrical means for deriving voltages representing the instant position coordinates of the simulated flight, means for deriving potential corresponding in magnitude to the distance between said station and the destination point, resolving means energized by said distance potential and adjustable according to a bearing angle from said station to said destination point for obtaining potential representing the position coordinates of said destination point, means for summing said instant and destination coordinate potential for obtaining potential representing coordinate difference values, resolving means initially adjustable according to the desired flight course bearing and energized by said coordinate difference potential for obtaining a pair of potentials representing deviation from said flight course and the instant distance to said destination point respectively, and course and distance indicating means controlled by and in accordance with said last-named potentials respectively.

14. Training apparatus for simulating radio navigation *between two points* [between two points defining a course offset] with respect to a radio range reference station comprising means for deriving voltages representing the coordinates of instant position of a simulated flight, means initially adjustable according to the distance between said station and the destination point and to a bearing angle from said station to said destination point for obtaining voltages representing the position coordinates of said destination point, means for algebraically summing said instant position and destination coordinate voltages for obtaining voltages representing coordinate difference values, inductive means energized by the aforesaid difference voltages and including relatively movable primary and secondary windings and means responsive to voltage induced in said secondary winding for adjusting said windings to a null voltage position, said position as referred to a reference position representing the actual course bearing, means adjustable according to the trainer compass heading for deriving a voltage representing compass heading, an inductive device having a primary winding energized by said compass voltage and a secondary winding, one of said windings being adjustable by said null positioning means according to the aforesaid actual course bearing, and means responsive to the voltage induced in said secondary winding representing an automatic direction finder indicator.

[15. Training apparatus for simulating radio navigation between two points defining a course offset with respect to a plurality of radio range reference stations comprising means for representing the compass heading of the aircraft, means for deriving voltages representing coordinants of instant position of a simulated flight, data-setting means, one for each station initially adjustable according to the relative position of the corresponding station with respect to the destination point for obtaining respective voltages representing position coordinants of said destination point, means associated with each data-setting means and said instant position means for obtaining respective voltages representing the coordinant differences of said instant and destination points, and a plurality of voltage resolving means each energized by a respective set of coordinate difference voltages and adjustable according to the aforesaid compass heading for positioning respective indicating means so as to represent dual automatic direction finding apparatus.]

[16. Training apparatus for simulating radio navigation between two points defining a course offset with respect to first and second radio range reference stations comprising means for representing the compass heading of the aircraft, means for deriving voltages representing coordinants of instant position of a simulated flight with respect to one of said stations, means initially adjustable according to the relative position of a first reference station with respect to the destination point for obtaining voltages representing position coordinants of said destination point, means energized by said instant and destination voltages for obtaining voltages representing the coordinant differences of said instant position and destination points, voltage resolving means energized by the aforesaid coordinant difference voltages and adjustable according to the aforesaid compass heading for positioning indicating means so as to represent automatic direction finding apparauts with respect to said first reference station, means also initially adjustable according to the relative position of a second reference station with respect to said destination point for obtaining additional voltages representing position coordinates of said destination point, means energized by said instant and additional voltages for obtaining voltages representing the coordinate differences of said instant position and destination points, voltage resolving means energized by the last-named coordinate difference voltages and adjustable according to the aforesaid compass heading for positioning additional indicating means so as to represent automatic direction finding apparatus with respect to said second reference station, thereby simulating dual automatic direction finding equipment.]

17. Training apparatus for simulating radio navigation between two points defining a course offset with respect to a radio range reference station comprising means for deriving voltages representing the coordinates of instant position of a simulated flight, means initially adjustable according to the relative position of said station with respect to the destination point for obtaining voltages representing the position coordinates of said destination point, computing means initially adjustable according to the desired flight course bearing from an origin point to said destination point and jointly responsive to said instant position and destination coordinate voltages for obtaining potential representing the instant distance to said destination point respectively, and indicating means controlled by and in accordance with said last-named potential for indicating the instant distance to destination.

18. Training apparatus for simulating radio navigation between two points defining a course offset with respect to a radio range reference station comprising electrical means for deriving voltages representing the instant position coordinates of the simulated flight, means for obtaining voltages representing the position coordinates of said destination point, means for summing said instant and destination coordinate voltages for obtaining potentials representing coordinate difference values, and resolving means initially adjustable according to the desired flight course bearing and energized by said coordinate difference potentials for obtaining potentials representing deviation from said flight course, and indicating means controlled by and in accordance with said last-named potential.

19. Training apparatus for simulating radio navigation between two points defining a course offset with respect to a radio range reference station comprising means for deriving control quantities representing the coordinates of instant position of a simulated flight, means initially adjustable according to the relative position of said station with respect to the destination point for obtaining control quantities representing the position coordinates of said destination point, computing means initially adjustable according to the desired flight course bearing from an origin point to said destination point and jointly responsive to said instant position and destination coordinate control quantities for obtaining a resultant control quantity representing deviation from said flight course, and indicating means controlled by and in accordance with said last-named resultant control quantity for indicating the extent of deviation from said course.

20. Training apparatus for simulating radio navigation in either direction with respect to a radio range reference station and another point comprising means for deriving control quantities representing the coordinates of instant position of a simulated flight, means for obtaining control quantities representing the coordinates of said point, computing means initially adjustable according to the desired flight course bearing and jointly responsive to said instant position control quantities and said point coordinate control quantities for obtaining in turn control quantities representing deviation from said flight course and the instant distance to destination respectively, and indicating means controlled by said last-named control quantities for indicating respectively course deviation and the instant distance to destination.

21. Training apparatus for simulating radio navigation *between two points* [between two points defining a course offset] with respect to a radio range reference station comprising means for representing the compass heading of the aircraft, means for deriving control quantities representing the coordinates of instant position of a simulated flight, means for obtaining control quantities representing the position coordinates of the destination point, means controlled according to said instant and destination coordinate control quantities for representing the actual course bearing for instant flight position and means adjustable according to the operation of both said course bearing and compass heading means for simulating an automatic direction finder.

*22. Apparatus for simulating dual ADF radio navigation with respect to two radio stations for establishing a fix for the instant flight position comprising means for representing the compass heading of the aircraft, means for deriving voltages representing the coordinants of the instant position of the simulated flight with respect to a fixed reference point, first data-setting means initially adjustable by an instructor according to the relative position of one of said stations with respect to said reference point for obtaining voltages representing the coordinants of said station with respect to said reference point, second data-setting means initially adjustable by the instructor according to the relative position of the other station with respect to said reference point for obtaining voltages representing the coordinants of said other station with respect to said reference point, a computing means operatively related to each of said data-setting means and adjustable according to the orientation of said compass heading means for determining the bearing from said flight position to the respective radio station, each computing means being responsive to the algebraic sum of said instant position voltages and the respective station voltages, and respective indicating means operable by said computing means for simultaneously indicating said station bearings thereby to simulate dual ADF apparatus.*

*23. Apparatus for simulating dual ADF radio navigation with respect to two radio stations for establishing a fix for the instant flight position comprising means for representing the compass heading of the aircraft, means for deriving voltages representing the coordinants of the instant position of the simulated flight with respect to a fixed reference point, first data-setting means including potentiometer means initially adjustable by an instructor according to the relative position of one of said stations with respect to said reference point for obtaining voltages representing the coordinants of said station with respect to said reference point, second data-setting means including potentiometer means initially adjustable by the instructor according to the relative position of the other station with respect to said reference point for obtaining voltages representing the coordinants of said other station with respect to said reference point, a computing means operatively related to each of said data-setting means, each computing means including voltage resolving means responsive to the algebraic sum of said instant position voltages and the respective station voltages and adjustable in accordance with the orientation of said compass heading means for determining the bearing from said flight position to the respective radio station, and respective indicating means operable by said computing means for simultaneously indicating said station bearings thereby to simulate dual ADF apparatus.*

*24. Training apparatus for simulating radio navigation by direction finding equipment comprising means for representing the compass heading of the aircraft, means for deriving voltages representing the coordinates of instant position of a simulated flight with respect to a station or reference point, means for obtaining voltages representing the position coordinates of a compass locator station with respect to said reference point, means controlled according to said instant and locator station coordinate voltages for representing the bearing of said locator station from said instant flight position and means adjustable according to the operation of both said bearing and compass heading means for positioning indicating means simulating an automatic direction finder.*

*25. Training apparatus for simulating radio navigation by direction finding equipment comprising means for representing the compass heading of the aircraft, means for deriving voltages representing the coordinates of instant position of a simulated flight with respect to a station or reference point, means including data-setting means for obtaining voltages representing the position coordinates of a compass locator station with respect to said reference point means for algebraically summing said instant and locator station coordinate voltages, means responsive to said summing means for representing the bearing of said locator station from said instant flight position and means adjustable according to the operation of both said bearing and compass heading means for positioning indicating means simulating an automatic direction finder.*

*26. Training apparatus for simulating radio navigation by direction finding equipment comprising means for representing the compass heading of the aircraft, means for deriving voltages representing the coordinates of instant position of a simulated flight with respect to a station or reference point, means including data setting means initially adjustable by an instructor for obtaining voltages representing the position coordinates of a compass locator station with respect to said reference point, means for algebraically summing said instant and locator station coordinate voltages, and voltage resolving means jointly responsive to said summing means and said compass heading means for positioning indicating means simulating an automatic direction finder with respect to said instant flight position and compass locator station.*

RICHARD CARL DEHMEL.

(References on following page)

REFERENCES CITED

The following references are of record in the file of this patent or the original patent:

UNITED STATES PATENTS

| Number | Name | Date |
|---|---|---|
| 2,070,178 | Pottenger | Feb. 9, 1937 |
| 2,137,847 | Libman | Nov. 22, 1938 |
| 2,164,412 | Koster | July 4, 1939 |
| 2,308,566 | Noxon | Jan. 19, 1943 |
| 2,321,799 | Cone | June 15, 1943 |
| 2,346,693 | Lyman | Apr. 18, 1944 |
| 2,366,603 | Dehmel | Jan. 2, 1945 |

| Number | Name | Date |
|---|---|---|
| 2,389,359 | Grow | Nov. 20, 1945 |
| 2,396,857 | Kittridge | Mar. 19, 1946 |
| 2,399,726 | Doyle | May 7, 1946 |
| 2,406,836 | Holden | Sept. 3, 1946 |
| 2,406,953 | Lewis | Sept. 3, 1946 |
| 2,408,081 | Lovell | Sept. 24, 1946 |
| 2,417,229 | Alexanderson | Mar. 11, 1947 |
| 2,432,939 | Sanders | Dec. 16, 1947 |
| 2,439,169 | Kittridge | Apr. 6, 1948 |
| 2,439,381 | Darlington | Apr. 13, 1948 |
| 2,448,544 | Muller | Sept. 7, 1948 |
| 2,463,094 | Field | Mar. 1, 1949 |